United States Patent [19]

Mariotti

[11] Patent Number: 4,949,879
[45] Date of Patent: Aug. 21, 1990

[54] DISPENSING MEANS FOR PIECES OF PRODUCT

[75] Inventor: Rene G. Mariotti, St. Cloud, France

[73] Assignee: Ore-Ida Vended Products, Inc., Boise, Id.

[21] Appl. No.: 81,507

[22] Filed: Aug. 4, 1987

[30] Foreign Application Priority Data

Aug. 4, 1986 [FR] France .................. 86 11258

[51] Int. Cl.⁵ .................................................. G01F 22/00
[52] U.S. Cl. ................................. 222/413; 222/240; 99/407
[58] Field of Search ............... 222/240, 413, 55–56; 99/404, 407

[56] References Cited

U.S. PATENT DOCUMENTS

| | | | |
|---|---|---|---|
| 286,384 | 10/1883 | Caine | 222/240 X |
| 1,673,313 | 6/1928 | Cornelius | 222/227 |
| 2,973,855 | 3/1961 | Pro | 198/608 |
| 3,357,341 | 12/1967 | Kocken et al. | 99/407 X |
| 4,215,803 | 8/1980 | Schafer | 222/240 |
| 4,502,372 | 3/1985 | Mariotti | 99/330 |
| 4,505,193 | 3/1985 | Mariotti | 99/330 |
| 4,512,502 | 4/1985 | Landers | 222/413 |

FOREIGN PATENT DOCUMENTS 828758 2/1960 United Kingdom .

Primary Examiner—Michael S. Huppert
Attorney, Agent, or Firm—Burns, Doane, Swecker & Mathis

[57] ABSTRACT

A dispenser for a product in the form of pieces or chips includes a hopper into which the product is loaded. The hopper has a discharge orifice and houses a feed screw which extends outwardly through the discharge orifice. Divergent legs are located adjacent to the hopper discharge orifice and extend in the feed direction for the product.

2 Claims, 1 Drawing Sheet

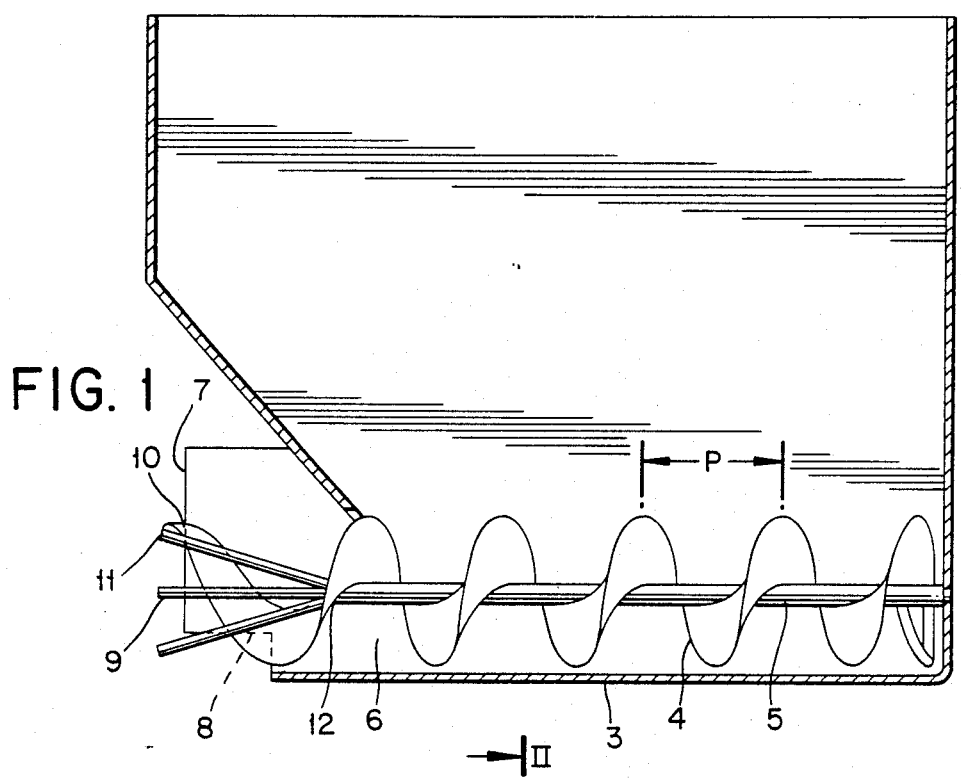
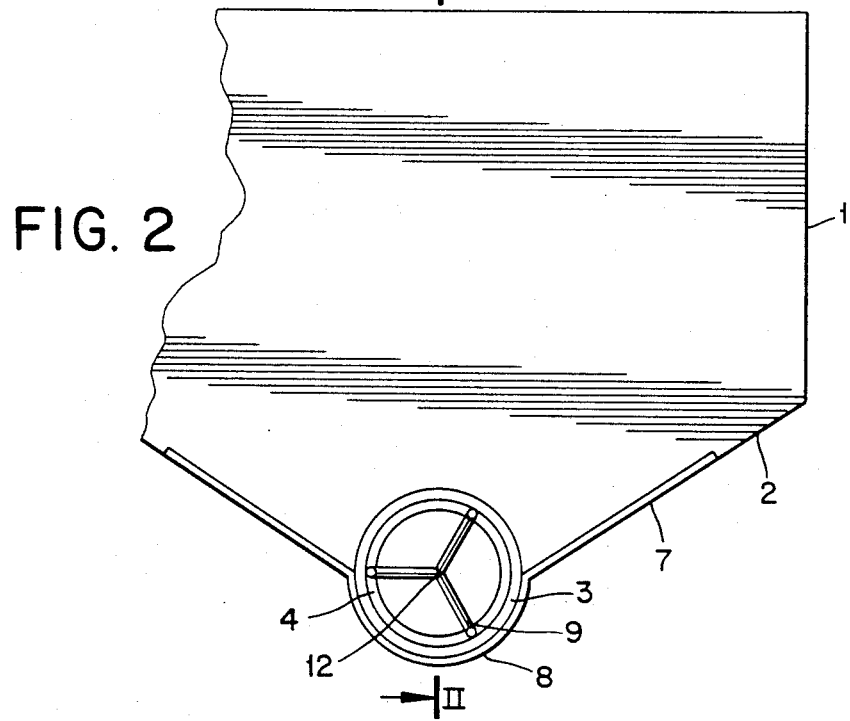

DISPENSING MEANS FOR PIECES OF PRODUCT

The present invention relates to a means for dispensing a predetermined amount of a product, such as potato chips or french fries, in the form of pieces or chips, particularly products which have been initially refrigerated and stored for subsequent cooking or heating as, for example, in the case of a french fry vending machine or similar device where the food portion is distributed into a receptacle accessible to a consumer.

The dispensing means of the present invention is particularly applicable for use in the self-contained fryer described in Applicant's U.S. Pat. Nos. 4,502,372 and 4,505,193, which are each incorporated herein by reference. In U.S. Pat. No. 4,505,193 a deep fryer is described having means for dispensing and weighing a predetermined amount of a frozen food product on a balance, conveying the weighed product to a deep fryer pan, deep frying the product and then delivering the cooked product to a receptacle accessible to a consumer.

In the case of metering out a desired quantity of frozen french fries, difficulties can sometimes occur in dispensing the desired amount of product onto the weighing means. In particular, frozen products, in the form of chips, french fries, and the like, can adhere to each other when being dispensed onto the weighing means, thus resulting in the dispensing of a cluster of the product, in an amount which may exceed the predetermined amount. The inability to remove the excess amount of weighed product prior to the deep frying and delivery steps results in the distribution of a greater than desired portion of product.

It is an object of the Present invention to provide, in a deep fryer, such as above-described, dispensing means which prevent food product pieces from adhering to each other as they are dispensed onto a balance or the like.

It is a further object of the present invention to provide a dispensing means which permits the dispensing of individual pieces of the food Product one at a time onto the weighing means or at least, with reduced "clumping" or clustering of the pieces.

Another object of the present invention is to provide dispensing means which dispenses a predetermined amount of a food product onto a balance, prior to the cooking and/or delivery of the product.

The present invention overcomes the previously described drawbacks and achieves advantageous results, by providing, in the lower end of a hopper, a helical conveyor screw, or an Archimedes screw which extends from one end of the shaft and branches outwardly from the axis into legs which intercept the product exiting from the screw and help separate food pieces which may have become stuck together. The branched end of the screw shaft is adjacent to a hopper discharge orifice which permits dispensing of the food product onto the weighing means. The branched legs enable the food product to be separated into individual pieces prior to the dispensing of these pieces through the discharge orifice onto the weighing means.

In one embodiment of the invention, the dispensing means includes three legs forming an angle of 120° between them. Preferably, the free ends of the legs are evenly spaced apart over 360°. The legs may be welded to the end of the shaft of the Archimedes screw and the free edge of the last screw thread is welded to one of these legs.

Advantageously, the length of each leg is greater than the normal pitch of the feed screw, and the pitch separating the last screw thread of said screw, which is outside the hopper, and the thread most adjacent to the last thread, is equal to the length of said legs. Thus, the product in the form of pieces or chips are preferably spread out by the last screw thread of the feed screw and are even further separated from each other by the action of the legs.

The invention will be better understood from reading the following description with reference to the accompanying drawings in which:

FIG. 1 is a cross-sectional view along the line II—II of FIG. 2 of the hopper incorporating the improved dispensing means of the invention, and FIG. 2 is an end view of the bopper, showing the dispensing end of the feed screw.

Referring to FIG. 1, it can be seen that the hopper is formed of an enclosure with vertical side walls 1 and bottom walls 2 converging towards a channel 3 in which is housed an Archimedes feed screw 4 rotated by means of its shaft 5. The screw 4 extends outwardly from the hopper through a discharge orifice 6. The discharge orifice communicates with a wide bell mouth channel 7 having an opening 8 at it lower part, said opening 8 being generally level with the weighing means (not shown). The weighing means may comprise a device of the type described in the above-referenced U.S. Pats. No. 4,505,193 and 4,502,372.

As can be seen, shaft 5 terminates near the end of the discharge opening to branch out into three legs 9 which diverge angularly from the direction of shaft 5 and are equally spaced apart to form an angle of 120° with each other. Legs 9 are welded at 12 to the end of shaft 5. The free edge of the screw thread 10 is welded at 11 to one of legs 9. The length of legs 9 is greater than the normal pitch p of the feed screw. The pitch between the last screw thread 10 and its most adjacent screw thread is longer than the normal pitch p. Thus, screw thread 10 has a gentler slope than the other threads, causing the product, in the form of chips or pieces contained in the hopper, to be spread out widely over its surface.

Thus the operation of the dispensing means of the present invention is as follows: The product in the form of pieces contained in hopper 1 falls by gravity onto the Archimedes feed screw 4 which is driven with rotational movement about its shaft 5 by a suitable motor (not shown). As is well known, the pieces are thus driven towards the discharge orifice 6, reaching the last screw thread 10 of the feed screw. There they are separated from each other by legs 9 which rotate with the screw. As a result of the separation effect of the legs, the product pieces are dispensed practically one by one through orifice 8 onto the weighing means.

Although the invention has been described with reference to the preferred embodiment described above, it should be understood that certain variations and modifications may be made without departing from the spirit and scope of this invention. For example, the feed screw can be of varying pitch and size, and the legs can vary in number and be affixed to the screw or shaft in any suitable way.

A dispensing device for products such as potato chips or french fries includes a screw housed in a lower part of a hopper loaded with the products to be dispensed. The screw extends outwardly through a discharge opening of the hopper. At the level of the discharge opening, the screw diverges into a group of legs which extend outwardly from one another and from the screw.

What is claimed is:

1. A means for dispensing a product in the form of pieces or chips, comprising: a hopper into which the pieces or chips of product are loaded, having a hopper discharge orifice; feed screw which is housed in the hopper to receive said product, said screw extending outwardly from the hopper through the hopper discharge orifice and having divergent legs located adjacent the hopper discharge orifice and extending in the feed direction of said product;

wherein the legs are of identical length; and wherein the length of each leg is greater than the normal pitch of the screw, and the pitch separating the final screw thread nearest the outwardly extending end of the screw and the thread most adjacent to the final screw thread is equal to the length of each leg.

2. A means for dispensing a product in the form of pieces or chips, comprising: a hopper into which the pieces or chips of product are loaded, having a hopper discharge orifice; feed screw extending outwardly from the hopper through the hopper discharge orifice and having divergent legs located adjacent the hopper discharge orifice and extending in the feed direction of said product; and wherein a free edge of the last screw thread located nearest to the outwardly extending end of the screw is welded to one of the legs.

* * * * *